United States Patent [19]

Bates et al.

[11] 3,911,157

[45] Oct. 7, 1975

[54] PROCESS FOR PREPARING TEXTURIZED VEGETABLE PROTEIN

[75] Inventors: Norman Andrew Bates, Wyoming; Robert Earl Tarr, Forest Park, both of Ohio

[73] Assignee: The Procter & Gamble Company, Cincinnati, Ohio

[22] Filed: Nov. 13, 1974

[21] Appl. No.: 523,649

[52] U.S. Cl. .............. 426/459; 426/510; 426/802
[51] Int. Cl.² ............................................ A23J 3/00
[58] Field of Search ........... 426/459, 508, 510, 511, 426/802, 364

[56] References Cited
UNITED STATES PATENTS

| | | | |
|---|---|---|---|
| 3,142,571 | 7/1964 | McAnelly | 426/141 |
| 3,498,794 | 3/1970 | Calvert et al. | 426/364 |
| 3,840,679 | 10/1974 | Liepa et al. | 426/364 X |
| 3,843,816 | 10/1974 | Touba | 426/364 X |

*Primary Examiner*—James R. Hoffman
*Attorney, Agent, or Firm*—Louis G. Xiarhos

[57] ABSTRACT

A process for preparing texturized vegetable protein from non-textured vegetable materials is described. The process comprises: forming a dough from a source of vegetable protein and water; roll milling the dough to a sheet thickness of 18 mils or less to effect cellular disruption and expose coagulable protein molecules; and cooking the sheeted protein at from 180°F to 300°F in the presence of a non-drying atmosphere of moist steam. The texturized protein is especially adapted to use as an extender for comminuted meat items.

10 Claims, No Drawings

PROCESS FOR PREPARING TEXTURIZED VEGETABLE PROTEIN

BACKGROUND OF THE INVENTION

This invention relates to a process for preparing texturized vegetable protein products. More particularly, it relates to a process for preparing products having a meat-like chewiness and quality from non-textured vegetable protein material.

Considerable effort has been directed in recent years toward the manufacture of simulated meat products from vegetable protein material. These efforts have been largely directed toward alleviating the shortage of nutritional protein for human consumption. Food technologists have described various methods for converting non-textured vegetable protein into meat-like products simulating the fibrous chewing quality of meat. One method has involved the manufacture of protein fibers by an adaptation of the spun fiber method of making synthetic fibers in the textile industry. According to this method, protein fibers are made by passing a solution or dispersion of alkaline phase protein through a spinnerette into an acidic coagulating bath and gathering the resulting fibers. Such a process is described in detail in U.S. Pat. No. 2,730,447, issued Jan. 10, 1956 to R. A. Boyer. Another method of preparing texturized vegetable protein has involved the thermoplastic extrusion of proteinaceous materials whereby a protein material is passed into a cooker-extruder under heat and pressure and extruded as described in U.S. Pat. No. 3,102,031 issued Aug. 27, 1963 to R. V. MacAllister et al., and in U.S. Pat. No. 3,488,770, issued Jan. 6, 1972 to W. T. Atkinson.

The various methods of preparing meat-like products from non-textured vegetable protein have been associated with certain notable disadvantages. For example, the fiber spinning and extrusion methods involve considerable capital expenditure for manufacturing operations and frequently present difficulties in production scale-up. Moreover, the amount of texturization is generally proportional to the protein content of the vegetable protein starting material, thus, making the attainment of high levels of texturization difficult where inexpensive raw materials such as soy flakes or meals having a relatively lower protein content than the purer concentrates or isolates are desirably employed. In addition, extrusion methods tend to impart a toasted, or burnt, off-flavor or quality to the meat-like extrudate which may be objectionable to some consumers.

It is an object of the present invention to provide a texturized vegetable protein product by a process which permits the utilization of inexpensive vegetable protein raw materials.

Another object of the invention is the provision of a process for providing texturized vegetable protein free from an objectionable toasted-like or burnt off-flavor.

Another object of the invention is the provision of a process for preparing texturized meat-like vagetable protein by a method which avoids the need for fiber spinning or thermoplastic extrusion methods.

Other objects will become apparent from the detailed description appearing hereinafter.

SUMMARY OF THE INVENTION it has been discovered that the foregoing objects can be achieved by a process which comprises forming a coherent dough from a proteinaceous material, roll milling the dough to a sheet thickness of 18 mils or less so as to provide the protein content thereof in an exposed and coagulable state and heating the resulting proteinaceous material at a temperature of from 180°F to 300°F in the presence of moist steam to coagulate or insolubilize and, thus, texturize the proteinaceous material into a chewy or meat-like product. It has been discovered that desirable and extensive texturization of inexpensive protein-source materials, such as soy meals, flours or flakes, can be realized without the attending toasted off-flavor of an extruded product by the combined effects of a disrupting milling step which provides a sheet of 18 mils or less thickness and a subsequent moist-steam cooking step. These desirable objectives are attainable without recourse to the relatively more expensive spinnerette or thermoplastic extrusion methods and their attending limitations or disadvantages.

DETAILED DESCRIPTION OF THE INVENTION

The process of the present invention comprises the steps of forming a coherent dough from a proteinaceous source material, roll milling the dough into a sheet of prescribed thickness and cooking the sheet under the non-drying conditions of moist steam. These steps are described in detail hereinafter.

The dough formation comprises mixing a suitable proteinaceous source material with water to form a coherent dough-like mix. As used herein, the term "dough" refers to a coherent workable mass, i.e., one which will hold together sufficiently to permit sheet formation even though the sheet may be fragmented and the mass may not have the smoothness or textural consistency of ordinary bread dough. The dough can be formed from an admixture of from 90% to 40% by weight of the proteinaceous source material and from 10% to 60% water. Any of a variety of mixers can be used for this purpose, including planetary paddle mixers, sigma mixers, ribbon blenders, twin-paddle mixers, Hobart mixers, extruders, and other wellknown mixers such as Omnimixers. The moisture content of the dough should be sufficiently high as to permit formation of a coherent mass. Normally at least about 10% water content will permit desired coherency. Amounts of water greater than about 60% will normally be avoided since they provide a dough which is pasty and difficult to handle, particularly in sheet formation and removal of the sheet from a roll mill.

The precise moisture content within the above specified range to be utilized in any particular process, will depend upon the particular proteinaceous source material employed and the operational parameters of the roll mill in sheet formation. It is preferred that the moisture content be within the range of from 15% to 40% by weight and that the vegetable protein material comprise from 60% to 85% by weight of the dough.

To insure uniform distribution of moisture in the wet mix, after sufficient moisture has been added to provide a moisture content within the range of from 10% to 60% by weight of the dough, the dry proteinaceous source material to which moisture is added should be mixed to provide a substantially uniform coherent workable dough. Mixing time is not critical and will depend upon the protein source utilized, the composition of the mix and the kind of mixing device employed. The moisture content of the dough, as used herein, is intended to include the moisture, i.e. water, initially present in the proteinaceous source material.

Suitable proteinaceous source materials for use in the process of the present invention include the vegetable protein materials typically employed in texturization methods. These include the proteinaceous materials from such sources as soybeans, safflower seed, sunflower seed, wheat, peanut, cottonseed, sesame and peanuts. Preferred herein are the proteinaceous materials from soy and including soybean flakes, grits or flour or other subdivided form of soybean particles. Preferably, the soybean material, e.g. flakes, will be defatted, for example, by solvent extraction, desolventized and comminuted to a desired particulate state. Hexane-extracted soy flakes having a protein content of at least 50% are especially preferred herein and are prepared from soybeans that are cracked, dehulled, flaked and extracted. A product of desirable blandness and freedom from a characteristic beany off-flavor is provided where the flakes are also deflavored and accordingly, deflavored soy flakes are especially preferred herein. Soy flour and grits are also useful herein and are obtained by grinding defatted flakes. Soy grits are obtained by grinding flakes to particle sizes larger than 100 mesh, while soy flours are generally products of 100 mesh or finer.

While the process of the present invention can be employed by utilizing soy protein concentrates or isolates which characteristically have a protein content, respectively, of greater than 70% or 90% on a dry basis, the costs inherent in the separation techniques necessary to achieve their state of relative purity makes them commercially unattractive for certain uses. For example, the application of simulated-meat products as extenders in comminuted meat items, such as canned chili, spaghetti sauce with meat, meat loaves, sausages and patties normally calls for the employment of meat-like products from relatively less expensive protein materials, such as meal, flakes, grits or flour. Since such relatively less expensive soy materials have a lower protein content, texturization is relatively more difficult. Extensive texturization can, however, be achieved by the combined effects of milling to a sheet thickness of 18 mils or less thickness so as to disrupt and expose protein matter and cooking under the non-drying conditions of hot moist steam. The process of the present invention has, therefore, its greatest applicability to the texturization of vegetable protein materials having a protein content or a dry weight basis of from 30% to 60%.

A variety of optional ingredients can be admixed with the proteinaceous dough for incorporation into the texturized vegetable protein product. Nutrients, such as vitamins and minerals and flavoring ingredients can be suitable employed as desired.

The roll milling of the dough into a sheet constitutes an essential and critical step of the process of the present invention. It has been found that extensive texturization is not obtained unless the dough is sheeted to a thickness of 18 mils (0.018 inch) or less. If the sheet is milled to a thickness greater than 18 mils, the mechanical working imparted to the dough by the action of the mill rolls is insufficient to provide adequate texturization. While applicants do not wish to be bound by any precise theory or explanation, it is believed that the formation of a sheet of 18 mils or less thickness causes sufficient disruption of cellular material as to expose protein molecules which can be subsequently insolubilized or denatured by a cooking operation. Normally the dough will be roll milled to provide a sheet having a thickness of at least 4 mils so as to minimize handling difficulties and excessive fragmentation of the sheet and to facilitate removal from the mill rolls. Preferably, the sheet has a thickness in the range of from 8 to 12 mils. Such a sheet comprises a sufficient amount of cellular disruption as to permit extensive texturization and allows for ready handling of the sheet material.

The roll milling step can be practiced by resort to known milling apparatus. Suitable apparatus includes any roll mill, usually a two-roll mill, capable of applying relatively uniform pressure to the dough fed into the nip of the mill rolls and capable of nip adjustment. It will be appreciated that the nip can be adjusted in known manner to suit the desired sheet thickness. In general, the desired sheet thickness can be obtained by employing a gap slightly smaller than the desired sheet thickness so as to allow for dough sheet expansion upon emergence from the nip. Normally, a gap of less than 10 mils will assure that the sheet thickness does not exceed about 18 mils.

The process of the present invention can be practiced with the aid of any of a variety of roll mills capable of subjecting a proteinaceous dough to mechanical compressing action and adapted to the adjustment of pressure and roll speed. Suitable mills are those having two parallel rolls so that the dough passed between the rolls is crushed or flattened into the desired sheet thickness. Such mills will normally permit independent adjustment or variation of speed and temperature parameters such that the parameters can be varied as desired. Normally, smooth or highly polished rolls will be employed as they permit ready cleaning; other rolls can, however, be employed if the desired cellular disrupting and sheeting effects can be obtained.

The diameter of the roll mills, while it controls the angle of entry into the nip which in turn affects sheet thickness, is not critical per se. While rolls smaller than 6 inches in diameter can be employed to nip the dough feed, roll mills having a diameter of less than about 6 inches tend to hamper passage of the dough through the mill. Best results will be obtained from mills having diameters in the range of from 6 to 30 inches. Examples of suitable mills which can be adapted in known manner to operation within the parameters defined hereinbefore include any of the well-known and commercially available roll mills such as those sold under the tradenames of Lehmann, Thropp, Ross, Farrell and Lauhoff.

The process of the present invention can be readily practiced by passing the dough into the roll mill and removing sheeted material in the form of flakes or sheets of considerable expanse from the rolls. Normally, a hopper or other feeding device will be employed to drop the dough into the nip of the roll mill.

It is preferred that roll milling be employed under conditions of differential roll speed with the faster roll revolving at from 1% to 50% and preferably from 1% to 25% faster, than the slower roll. Differential roll speed facilitates transfer of the sheet expanse or pieces from the faster to the slower roll. While roll temperature can be adjusted as desired, operation at room temperature is especially suitable from the standpoint of avoiding a toasting or drying effect.

The roll pressure can be adjusted as needed to achieve desired sheet thickness. The sheet thickness will be a direct consequence of the amount of roll pressure employed. It will be appreciated that the precise roll pressure will depend in part upon the exact material which is to be sheeted and can be varied to achieve the requisite sheet thickness.

The mechanically worked and sheeted dough is subjected to a cooking or protein insolubilizing step. The cooking step comprises heating the sheeted protein material at a temperature of from 180°F to 300°F in the presence of moist steam. The condition of the steam is a critical aspect of the process of the present invention and is closely tied to and interrelated with the milling step and the state of the sheeted protein. If the protein dough is milled to a thickness greater than 18 mils, even cooking in the presence of moist steam provides inadequate texturization. The result is a product of mushy texture lacking in characteristic meat-like chewiness. Similarly, the cooking of a sheet of less than 18 mil thickness in the absence of steam or in the presence of steam of insufficient moistness will not provide adequate texturization.

Steam suitable for the process of the present invention is steam which is moist or non-drying in character and includes steam which is an equilibrium mixture of gaseous water (steam) and water droplets (moisture), hereinafter wet steam, and steam which is superheated to 5°F above the boiling point of water at its prevailing pressure. Suitable wet steam includes steam of 10% quality to 100% quality steam, the term "100% quality steam" referring to complete conversion of a source of water to steam. Preferably, wet steam of 50% or greater quality is utilized and provides a moisturizing condition whereby the cooking step effects extensive texturization. The steam may be permissibly superheated, i.e. heated above the boiling point at the prevailing pressure. Normally, steam superheated in excess of 5°F above its boiling point tends to promote a drying effect and is desirably avoided.

In actual practice the cooking step can be conducted by introducing steam into a vessel or chamber heated to a temperature of from 180°F to 300°F. Temperatures in excess of 300°F can promote an undesirable toasted-like flavor note and are, thus, to be avoided. Best results are obtained when the cooking temperature is in the range of from 212°F to 250°F. The cooking can be conducted under pressure or at atmospheric pressure. Autoclaves capable of withstanding pressure of up to 50 pounds per square inch gauge can be suitably employed. Similarly, a confined chamber maintained at the desired cooking temperature and at atmospheric pressure can be utilized, the steam being introduced to provide the requisite moisturizing or non-drying condition.

The cooking step is conducted for a time sufficient to complete texturization and will vary depending upon the nature of the particular proteinaceous source material employed and the cooking temperature and the pressure and the particulate state of the protein material. Texturization is realized, for example in from 5 minutes to 1 hour when the cooking is effected at from 180°F to 250°F under atmospheric pressure and in the presence of steam of 90% quality.

The sheeted dough can be comminuted or shaped, as desired, prior to the cooking or final texturizing step. Preferably, the expansive sheet portions or fragments are comminuted or subdivided so as to facilitate mass transfer of heat during cooking and to achieve substantially uniform cooking or texturization. This can be conveniently effected by subdividing the sheet or fragments thereof to pieces ranging in size from pieces of about ⅛×⅛ inches to pieces of about 5×5 inches. This comminution allows for improved handling and facilitates the cooking operation. Preferably the material is reduced in size to within the range of ½×½ inches to 1-½×1-½ inches. The size reduction can be achieved by the employment of any of a variety of cutters, choppers, shredders. The sheeted protein material can, alternatively, be shaped or molded prior to cooking so long as substantially uniform cooking and moisturizing can be realized under the particular cooking conditions employed.

The texturized vegetable protein product produced by the cooking operation can be dried in known manner to provide a rehydratable product having the chewiness of meat. The product will normally be dried sufficiently to assure microbiological stability, e.g. to a moisture level of 12% by weight or less. Normally, the moisture level will be in the range of from 1% to 8% by weight. The dried product can be ground or comminuted as desired. Grinding to a particle size of through 4 and on 40 U.S. mesh provides a texturized product especially suited as a meat extender.

The process of the present invention is characterized by a number of advantages in relation to alternative methods of preparing products of meat-like character from vegetable protein materials. For example, the employment of separate milling, sizing, cooking and drying steps permits greater flexibility and control than can be realized in a thermoplastic extrusion method where the functions of shearing or mastication, particle sizing, cooking and drying are performed in a unitary apparatus. This flexibility and control facilitates scale-up. Separate control or regulation of milling and cooking parameters allows for extensive texturization without the development of a toasted-like flavor. An important advantage of the process of the invention is the absence of any requirement that pure or expensive protein source materials be employed as is the case, for example, in the preparation of fibers in a spinnerette method. Readily available vegetable protein source materials such as soy meal or flakes can be effectively texturized and utilized as meat substitutes. Defatted and deflavored soy flakes, for example, can be texturized by the process of the present invention to provide a vegetable protein material especially suited to application as an extender for ground beef, hamburger or comminuted meat items.

The following examples illustrate the process of the present invention.

EXAMPLE 1

The following ingredients were mixed into a dough in a conventional Hobart mixer for 3 minutes:

|  | Grams |
|---|---|
| Defatted, deflavored soy flakes (5% moisture) | 1053 |
| Flavorings | 78 |
| Nutrients (vitamins, salt) | 1 |
| Water | 462 |
|  | 1594 |

After mixing, the dough was rolled to a 0.012 inch sheet thickness using an 8-inch diameter 2-roll Farrell mill. The roll speeds were 36 and 41 feet per minute, providing a 14% differential to aid in product transfer. the sheet coming off the mill was comminuted in a cutter into pieces approximately ½ × 1 inch so as to facilitate cooking. The material was then placed in a conventional autoclave and cooked at 240°F under a saturated steam atmosphere (100% quality steam) at 10 psig for 10 minutes. After cooking, the material was air-dried in a conventional oven at 190°F for 2 hours to approximately 3% moisture to achieve biological stability. The texturized vegetable protein was ground and sieved to achieve a final particle size of 8 on 20 mesh (U.S.).

The product of EXAMPLE 1 when rehydrated by admixture with twice its weight of water is suitably employed as a meat extender. A 75:25 by weight mixture of ground beef and the rehydrated texturized vegetable protein provides patties which can be fried to hamburgers having the texture and eating quality of non-extended patties.

Similar results are obtained when the soy flake vegetable protein source material of EXAMPLE 1 is replaced with soy meal, soy grits or a mixture thereof in that a texturized vegetable protein material is obtained.

EXAMPLE 2

The process of EXAMPLE 1 was repeated except that the cooking step was performed by introducing the comminuted proteinaceous dough material in a continuous manner in a Rietz screw conveyor cooker. The material was retained for 10 minutes in the moist steam environment of the cooker at 212°F and atmospheric pressure before exiting. The material was dried in a drying oven for 10 minutes at approximately 250°F and for 20 minutes at 210°F. The resulting product was ground to through 8 and on 40 U.S. mesh to provide a texturized vegetable protein product especially suited as an extender for comminuted meat items.

What is claimed is;

1. A process for preparing a meat-like protein product from vegetable protein which comprises the steps of forming a coherent proteinaceous dough comprising from 40% to 90% by weight of a vegetable protein material having a protein content of from 30% to 60% by weight and from 10% to 60% water; roll milling the proteinaceous dough to a thickness of 18 mils or less, thereby to disrupt the cellular structure of the vegetable protein material and provide a content of exposed and coagulable protein; and cooking the roll-milled dough by heating at from 180°F to 300°F in the presence of a non-drying atmosphere of moist steam.

2. The process of claim 1 wherein the coherent proteinaceous dough comprises from 60% to 85% vegetable protein material and from 15% to 40% water.

3. The process of claim 1 wherein the proteinaceous dough is milled to a thickness of from 8 to 12 mils.

4. The process of claim 1 wherein the vegetable protein material is selected from the group consisting of soy flakes, soy grits and soy flour.

5. The process of claim 1 wherein the roll-milled dough is cooked by heating in the presence of steam of at least 50% quality.

6. The process of claim 5 wherein the heating is conducted under a pressure of up to 50 p.s.i.g.

7. The process of claim 5 wherein the heating is conducted under atmospheric pressure.

8. The process of claim 1 wherein the roll-milled dough is comminuted prior to cooking.

9. The process of claim 8 wherein the cooked product is dried to a moisture content in the range of 1% to 8%.

10. The process of claim 9 wherein the dried product is ground to a particle size of through 4 and on 40 U.S. mesh.

\* \* \* \* \*